United States Patent
Cox et al.

(10) Patent No.: US 9,158,896 B2
(45) Date of Patent: Oct. 13, 2015

(54) METHOD AND SYSTEM FOR GENERATING A SECURE KEY

(75) Inventors: Michael Brian Cox, Menlo Park, CA (US); Phillip Norman Smith, Sunnyvale, CA (US); Stephen Donald Lew, Sunnyvale, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1836 days.

(21) Appl. No.: 12/029,432

(22) Filed: Feb. 11, 2008

(65) Prior Publication Data

US 2009/0202069 A1    Aug. 13, 2009

(51) Int. Cl.
| | |
|---|---|
| H04L 9/00 | (2006.01) |
| G06F 21/10 | (2013.01) |
| G06F 21/57 | (2013.01) |
| G06F 21/72 | (2013.01) |
| H04L 9/08 | (2006.01) |

(52) U.S. Cl.
CPC ............. *G06F 21/10* (2013.01); *G06F 21/575* (2013.01); *G06F 21/72* (2013.01); *H04L 9/0822* (2013.01); *H04L 9/0866* (2013.01); *G06F 2221/0755* (2013.01); *H04L 2209/20* (2013.01); *H04L 2209/603* (2013.01)

(58) Field of Classification Search
None
See application file for complete search history.

(56) References Cited

U.S. PATENT DOCUMENTS

| | | | |
|---|---|---|---|
| 5,457,748 A | 10/1995 | Bergum et al. | |
| 6,046,676 A | 4/2000 | Ward et al. | |
| 6,185,678 B1 | 2/2001 | Arbaugh et al. | |
| 7,430,585 B2 | 9/2008 | Sibert | |
| 7,774,596 B2 | 8/2010 | Flynn | |
| 8,719,585 B2 | 5/2014 | Grigor et al. | |
| 9,069,706 B2 | 6/2015 | Sriram et al. | |
| 2001/0011347 A1 | 8/2001 | Narayanaswamy et al. | |
| 2003/0023822 A1 | 1/2003 | Scott et al. | |
| 2003/0056107 A1 | 3/2003 | Cammack et al. | |
| 2003/0084337 A1 | 5/2003 | Simionescu et al. | |
| 2003/0095664 A1* | 5/2003 | Asano et al. | 380/277 |

(Continued)

FOREIGN PATENT DOCUMENTS

| | | |
|---|---|---|
| EP | 0961193 | 12/1999 |
| EP | 1845470 | 10/2007 |

(Continued)

OTHER PUBLICATIONS

Schneier, B., "Applied Cryptography", 1996, John Wiley & Sons, 2nd Edition, p. 190-191.*

(Continued)

*Primary Examiner* — Alexander Lagor (57) ABSTRACT

A method, system on a chip, and computer system for generating more robust keys which utilize data occupying relatively small die areas is disclosed. Embodiments provide a convenient and effective mechanism for generating a key for use in securing data on a portable electronic device, where the key is generated from repurposed data and a relatively small amount. A multi-stage encryption algorithm may be performed to generate the key, where the first stage may include encrypting the secure data, and the second stage may include encrypting the result of a logical operation on the encrypted secure data with a unique identifier of the portable electronic device. A secret key may be used as the encryption key for each stage. The result of the second encryption stage may include the generated key which may be used to perform subsequent operations on the portable electronic device.

20 Claims, 7 Drawing Sheets

(56) References Cited

U.S. PATENT DOCUMENTS

| | | |
|---|---|---|
| 2003/0115471 A1 | 6/2003 | Skeba |
| 2003/0177373 A1 | 9/2003 | Moyer et al. |
| 2004/0193873 A1 | 9/2004 | England |
| 2005/0232415 A1 | 10/2005 | Little et al. |
| 2005/0283601 A1 | 12/2005 | Tahan |
| 2005/0289067 A1 | 12/2005 | Lampson et al. |
| 2006/0002561 A1* | 1/2006 | Choi et al. .................. 380/277 |
| 2006/0136748 A1 | 6/2006 | Bade et al. |
| 2006/0174109 A1 | 8/2006 | Flynn |
| 2006/0174240 A1 | 8/2006 | Flynn |
| 2006/0179308 A1 | 8/2006 | Morgan et al. |
| 2007/0027988 A1 | 2/2007 | Lavin et al. |
| 2007/0055881 A1 | 3/2007 | Fuchs et al. |
| 2007/0083744 A1 | 4/2007 | Seok |
| 2007/0124409 A1 | 5/2007 | Sibert |
| 2007/0169098 A1 | 7/2007 | Kikuchi |
| 2007/0198851 A1* | 8/2007 | Goto ........................... 713/187 |
| 2007/0217614 A1 | 9/2007 | Fujiwara et al. |
| 2007/0234130 A1 | 10/2007 | Sullivan et al. |
| 2007/0300207 A1 | 12/2007 | Booth et al. |
| 2008/0040598 A1 | 2/2008 | Lee et al. |
| 2008/0077973 A1 | 3/2008 | Zimmer et al. |
| 2008/0082680 A1 | 4/2008 | Grewal et al. |
| 2008/0086630 A1 | 4/2008 | Rodgers et al. |
| 2008/0086652 A1 | 4/2008 | Krieger et al. |
| 2008/0114994 A1 | 5/2008 | Iyer et al. |
| 2008/0137848 A1 | 6/2008 | Kocher et al. |
| 2008/0165952 A1 | 7/2008 | Smith et al. |
| 2009/0205053 A1 | 8/2009 | Sriram et al. |
| 2009/0259854 A1 | 10/2009 | Cox et al. |
| 2010/0138668 A1* | 6/2010 | Tsuria et al. .................. 713/186 |
| 2010/0185845 A1 | 7/2010 | Takayama et al. |

FOREIGN PATENT DOCUMENTS

| | | |
|---|---|---|
| GB | 2427720 | 1/2007 |
| JP | 2004530235 A | 9/2004 |
| JP | 2005122733 A | 5/2005 |
| TW | 200306107 | 11/2003 |
| WO | WO02/21763 | 3/2002 |
| WO | 2006086301 A1 | 8/2006 |
| WO | 2008009112 A1 | 1/2008 |
| WO | WO2008/071572 | 6/2008 |

OTHER PUBLICATIONS

Yang Koshio, et al. Hardware-Dependent Software-Role of Firmware Study Bootloader from CPU Mechanism/Design of BIOS, Interface, Japan, CQ Publishing Co., Ltd., Jan. 1, 2008, vol. 34, No. 1, pp. 95-104.

* cited by examiner

METHOD AND SYSTEM FOR GENERATING A SECURE KEY

RELATED APPLICATIONS

The present application is related to U.S. patent application Ser. No. 12/029,467, filed Feb. 11, 2008, entitled "SECURE UPDATE OF BOOT IMAGE WITHOUT KNOWLEDGE OF SECURE KEY," naming Gordon Grigor and Phillip Smith and as inventors, assigned to the assignee of the present invention. That application is incorporated herein by reference in its entirety and for all purposes.

The present application is related to U.S. patent application Ser. No. 12/029,464, filed Feb. 11, 2008, entitled "MECHANISM FOR SECURE DOWNLOAD OF CODE TO A LOCKED SYSTEM," naming Phillip Smith, John Sasinowski, and Gordon Grigor as inventors, assigned to the assignee of the present invention. That application is incorporated herein by reference in its entirety and for all purposes.

The present application is related to U.S. patent application Ser. No. 12/029,463, filed Feb. 11, 2008, entitled "HANDLING OF SECURE STORAGE KEY IN ALWAYS ON DOMAIN," naming Michael Cox, Gordon Grigor, Phillip Smith, and Parthasarathy Sriram as inventors, assigned to the assignee of the present invention. That application is incorporated herein by reference in its entirety and for all purposes.

BACKGROUND OF THE INVENTION

Encryption processes are often used to secure data stored on computer systems. The encryption is commonly performed using a known key, where the key may subsequently be used to decrypt the data. Accordingly, the security of the encrypted data may be influenced by the encryption process itself and/or the key used by the encryption process to encrypt the data.

Smaller conventional devices, such as portable computer systems or the like, commonly store encryption keys within fuses of a device component die. Given that the die area of device components is limited, these smaller conventional devices generally use encryption keys which are small in size. Since the robustness of the device's security is influenced by the size of the key, smaller conventional devices generally offer limited security for the data stored on the devices.

Although this low-level of security was marginally suitable for smaller conventional devices in the past, smaller devices are beginning to store data requiring increased amounts of security. Additionally, an increased amount of content is becoming available for which digital rights management (DRM) mechanisms are used. Accordingly, the low-level of security offered by smaller conventional devices is insufficient to implement some DRM mechanisms, thereby limiting the content accessible by smaller conventional devices.

SUMMARY OF THE INVENTION

Accordingly, a need exists for an encryption key which occupies a smaller die area. Additionally, a need exists for such an encryption key which improves security of data stored on portable electronic devices. Embodiments of the present invention provide novel solutions to these needs and others as described below.

Embodiments of the present invention are directed to a method, system on a chip, and computer system for generating more robust keys which utilize data occupying relatively small die areas. More specifically, embodiments provide a convenient and effective mechanism for generating a key for use in securing data on a portable electronic device, where the key is generated from repurposed data (e.g., stored in fuses) and a relatively small amount (e.g., less than the generated key) of additional data (e.g., also stored in fuses). The repurposed data may include a secret key (e.g., a secure boot key used to authenticate boot code for use by the portable electronic device), a unique identifier of the portable electronic device (e.g., a serial number, MAC identifier, etc.), etc. A multi-stage encryption process may be performed to generate the key, where the first stage may include encrypting the secure data (e.g., padded with zeros, padded with one or more copies of the secure data, etc.), and the second stage may include encrypting the result of a logical operation (e.g., XOR operation, XNOR operation, OR operation, AND operation, etc.) of the encrypted secure data with the unique identifier of the portable electronic device. The secret key may be used as the encryption key for each stage. The result of the second encryption stage may include the generated key which may be used to perform subsequent operations (e.g., encrypting data on the portable electronic device, decrypting data on the portable electronic device, signing applications or other code, authenticating applications or other code, performing digital rights management (DRM) operations, etc.) on the portable electronic device.

Accordingly, a key may be generated which requires little space on a semiconductor die (e.g., only the additional space occupied by the secure data), yet provides strong security for data stored on the portable electronic device. The use of multiple encryption stages increases the difficulty of reverse engineering the encryption process and revealing the repurposed data (e.g., the secure data, the secure boot key, etc.) used to generate the key. Additionally, reverse engineering is made more difficult given the use of a strong encryption key (e.g., the secure boot key) for each encryption stage. Further, given that data unique to the portable electronic device (e.g., the unique identifier of the portable electronic device) is used to generate the key, the key is also unique to the device. Therefore, even if the key is discovered, the usefulness of the key with respect to other portable electronic devices is limited.

In one embodiment, a method of generating a secure key for use on a device includes accessing secure device data and a secret key from the device, the secret key for authenticating boot code for execution by a integrated circuit of the device. A first encryption of the secure device data may be performed to generate an encrypted result, wherein the first encryption includes encrypting the secure device data using the secret key as an encryption key. A unique identifier of the device may be accessed and used to perform a logical operation on the encrypted result and the unique identifier to generate a logical result. A second encryption of the logical result may be performed to generate the secure key, wherein the second encryption includes encrypting the logical result using the secret key as an encryption key, wherein the secure key is unique to the device, and wherein the secure key is larger than the secure device data.

The method may also include providing access to the secure key while restricting access to the secret key, and using the secure key to encrypt data on the device. The secure device data may be smaller than the secret key, and the method may further include padding the secure device data to increase the size of the secure device data prior to the first encryption, wherein the padding is selected from a group consisting of padding the secure device data with a plurality of zeros and padding the secure device data with at least one copy of the secure device data. Additionally, the first and second encryptions may utilize symmetric key cryptography in accordance with the advanced encryption standard (AES), and wherein the logical operation may utilize an XOR operation.

In another embodiment, a integrated circuit for use in a portable electronic device, the integrated circuit may include a plurality of fuses for storing a secret key, secure device data, and a unique identifier of the portable electronic device, wherein the secret key is for authenticating boot code for execution by the integrated circuit. The integrated circuit may further include a secure encryption engine coupled to the plurality of fuses and for performing a first encryption of the secure device data to generate an encrypted result, wherein the first encryption uses the secret key as an encryption key, wherein the secure encryption engine is further operable to perform a logical operation on the encrypted result and the unique identifier to generate a logical result, wherein the secure encryption engine is further operable to perform a second encryption of the logical result to generate a secure key, wherein the second encryption uses the secret key as an encryption key, wherein the secure key is unique to the portable electronic device, wherein the first and second encryption enable access to the secure key without revealing the secret key, and wherein the secure key is larger than the secure device data.

And in yet another embodiment, a computer system may include a processor, a memory coupled to the processor, and a integrated circuit coupled to the processor. The integrated circuit may include a plurality of fuses for storing a secret key, secure device data, and a unique identifier of the computer system, wherein the secret key is for authenticating boot code for execution by the integrated circuit. Additionally, the integrated circuit may include a secure encryption engine coupled to the plurality of fuses and for performing a first encryption of the secure device data to generate an encrypted result, wherein the first encryption uses the secret key as an encryption key, wherein the secure encryption engine is further operable to perform a logical operation on the encrypted result and the unique identifier to generate a logical result, wherein the secure encryption engine is further operable to perform a second encryption of the logical result to generate a secure key, wherein the second encryption uses the secret key as an encryption key, wherein the secure key is unique to the portable electronic device, and wherein the first and second encryption enable access to the secure key without revealing the secret key, and wherein the secure key is larger than the secure device data.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "accepting," "accessing," "adding," "adjusting," "analyzing," "applying," "assembling," "assigning," "calculating," "capturing," "combining," "comparing," "collecting," "creating," "decreasing," "defining," "depicting," "detecting," "determining," "displaying," "establishing," "executing," "generating," "grouping," "identifying," "increasing," "initiating," "interacting," "modifying," "monitoring," "moving," "outputting," "padding," "performing," "placing," "presenting," "processing," "programming," "querying," "removing," "repeating," "sampling," "sorting," "storing," "subtracting," "tracking," "transforming," "using," or the like, refer to the action and processes of a computer system, or similar electronic computing device, that manipulates and transforms data represented as physical (electronic)

quantities within the computer system's registers and memories into other data similarly represented as physical quantities within the computer system memories or registers or other such information storage, transmission or display devices.

Embodiments of the Invention

Figure 1:
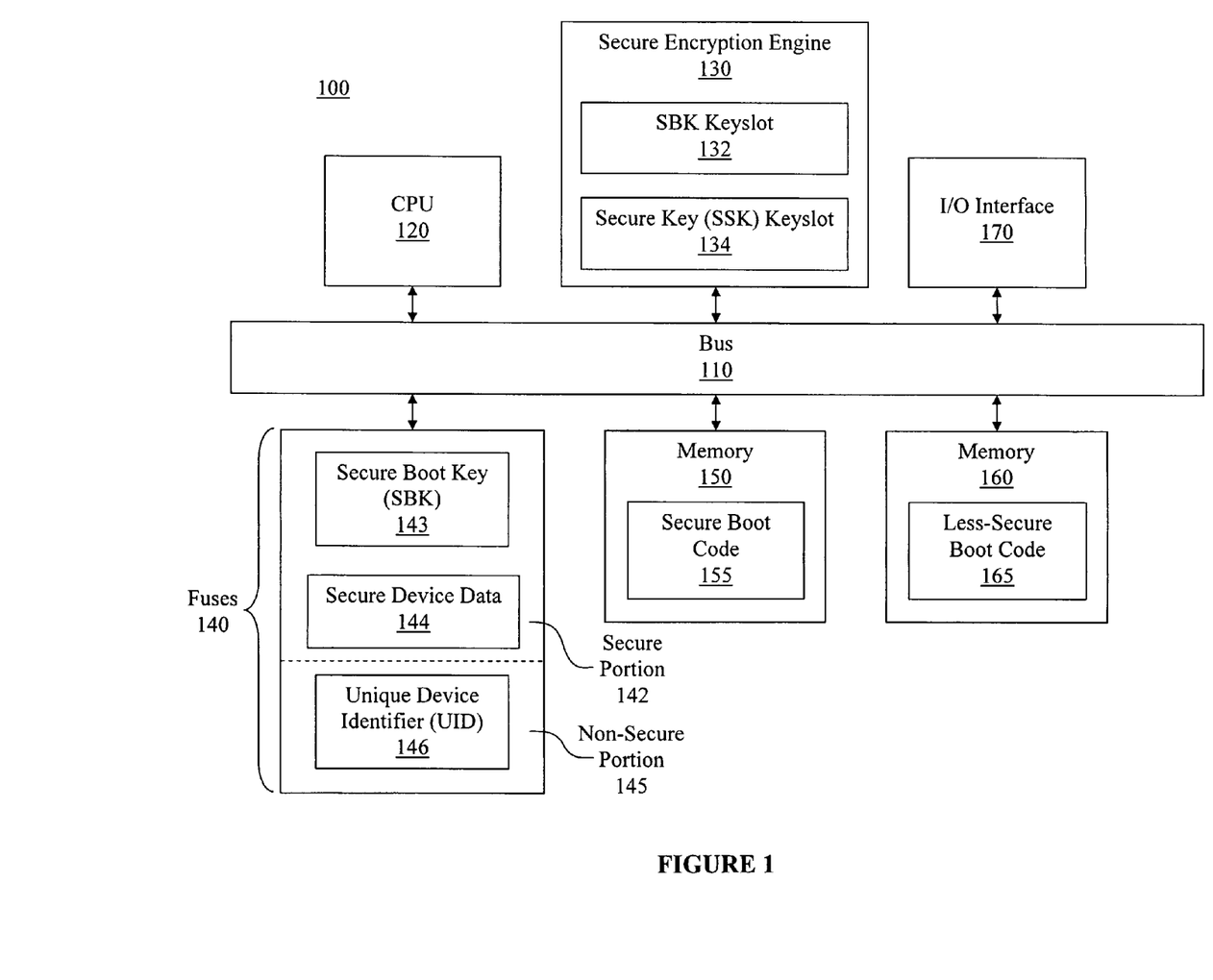
FIG. 1 shows a block diagram of an exemplary system on a chip for generating a secure key in accordance with one embodiment of the present invention.

FIG. 1 shows a block diagram of exemplary system on a chip or integrated circuit 100 for generating a secure key in accordance with one embodiment of the present invention. The term "secure key" or "SSK" as used herein may refer to a key used to perform operations (e.g., encrypting data on the portable electronic device, decrypting data on the portable electronic device, signing applications or other code, authenticating applications or other code, performing digital rights management (DRM) operations, etc.) on a computer system (e.g., a portable electronic device, system 600 of FIG. 6, another computer system, etc.). Additionally, in one embodiment, it should be appreciated that one or more components of system on a chip 100 may implement a graphics processor (e.g., 650 of FIG. 6) and/or other components of a computer system (e.g., 600 of FIG. 6).

As shown in FIG. 1, system on a chip 100 may comprise bus 110 for coupling central processing unit (CPU) 120, secure encryption engine 130, fuses 140, memory 150, memory 160, and input/output (I/O) interface 170. CPU 120 may comprise a processor for executing instructions or code (e.g., secure boot code 155 stored in memory 150, less-secure boot code 165 stored in memory 160, etc.), for controlling other components of system on a chip 160 (e.g., secure encryption engine 130 to perform encryption operations, decryption operations, authentication operations, signing operations, etc.), for controlling communications between system on a chip 100 and other components, devices, systems, etc. via I/O interface 170, etc. More specifically, in one embodiment, during execution (e.g., by CPU 120) of secure boot code 155, secure encryption engine 130 may access data (e.g., secure boot key (SBK) 143 from fuses 140, secure device data 144 from fuses 140, unique device identifier (UID) 146 from fuses 140, etc.) and perform a multi-staged encryption process (e.g., process 400 of FIG. 4) using the data to generate an SSK.

In this manner, a relatively small amount of data (e.g., secure device data 144) may be used to create a larger, more robust SSK by encrypting it along with existing data (e.g., SBK 143, UID 146, etc.) which is repurposed for generating the SSK, where features of the encryption process (e.g., multiple stages are used to make reverse engineering more difficult, use of a relatively large encryption key such as SBK 143 for each encryption stage, utilization of data unique to system on a chip 100 and/or a system incorporating system on a chip 100 to decrease the usefulness of the SSK to other devices or systems if discovered, etc.) increase security for data secured by the SSK as well as the data used to generate the SSK (e.g., secure device data 144, SBK 143, etc.).

Alternatively, the secure device data may be larger than the generated SSK. Accordingly, the secure device data (e.g., 144) and/or data generated from encryption of the secure device data may be reduced in size (e.g., to match the size of the SBK), where the reduction in size may occur before encryption, in between multiple encryption steps, after encryption, or some combination thereof.

The generated SSK may be stored in SSK keyslot 134 within secure encryption engine 130, along with SBK 143 stored in SBK keyslot 132, for future use by secure encryption engine 130, other components of system on a chip 100, etc.

For example, the SBK 143 and the generated SSK may be stored in their respective keyslots (e.g., 132 and 134) within secure encryption engine 130 before secure boot code 155 turns control over to less-secure boot code 165 (e.g., which may also be executed by CPU 120). In this manner, access to fuses 140 (e.g., secure portion 142) may be limited and/or other security measures (e.g., flushing caches or other memories storing secure information, etc.) may be taken to secure SBK 143 and/or the generated SSK before turning control over to less-secure boot code 165, thereby enabling secure encryption engine 130 to control subsequent access (e.g., read, write, etc.) to SBK 143 and/or the generated SSK (e.g., stored within their respective keyslots 132 and 134) to maintain security of the secure data in less-secure modes (e.g., during execution of less-secure boot code 165, other operating systems or applications run on system on a chip 100 in non-secure operating modes, other operating systems or applications run on a system incorporating system on a chip 100, etc.).

As shown in FIG. 1, SBK 143 may be used by system on a chip 100 to authenticate less-secure boot code (e.g., 165), where the authenticated less-secure boot code (e.g., 165) may be subsequently executed by system on a chip 100. The SBK (e.g., 143) may comprise a secret key in one embodiment. The less-secure boot code (e.g., 165) may be accessed from an external source (e.g., a NAND flash device, NOR flash device, another peripheral device, etc.) using I/O interface 170 and stored in memory 160 (e.g., comprising on-chip RAM, off-chip RAM, etc.), and therefore, may be authenticated by system on a chip 100 (e.g., during execution of secure boot code 155 using SBK 143) before execution. Secure boot code 155 may be stored locally on memory 150, where memory 150 comprises ROM in one embodiment. Accordingly, since SBK 143 may be used to perform important securing operations during high-securing modes, the security of SBK 143 when in less secure modes and/or when repurposing SBK 143 for use in generating the SSK may be maintained by controlling access to SBK 143 using secure encryption engine 130 (e.g., by limiting access to SBK 143 within fuses 140, by limiting access to the copy of SBK 143 stored in keyslot 132, etc.), by using a secure mechanism for generating SSK as described herein, etc.

Secure encryption engine 130 may also limit access to the generated SSK (e.g., stored in keyslot 134) for increasing the security of the generated SSK, data secured using SSK (e.g., as an encryption key for the data), the repurposed data used to generate the SSK (e.g., SBK 143, secure device data 144, etc.). Access to the SSK may be limited by secure encryption engine 130 during execution of less-secure boot code 165, execution of non-secure boot code, execution of non-boot (e.g., secure or non-secure) applications, etc.

Additionally, embodiments enable the generated SSK to be reprogrammed or re-specified. For example, the SSK stored in keyslot 134 may be overwritten (e.g., when in a secure boot mode during execution of secure boot code 155, less-secure boot code 165, etc.). The new SSK may be specified (e.g., by a system manufacturer who also specifies SBK 143 and/or secure device data 144, etc.). Alternatively, the SSK may be regenerated. For example, new secure device data 144 may be specified (e.g., by accessing different secure device data and using the new secure device data in the calculation of the SSK, reprogramming the fuses associated with secure device data 144 to change the content of secure device data 144, etc.).

As shown in FIG. 1, UID 146 may be stored in non-secure portion 145 of fuses 140 in one embodiment. UID 146 may comprise a serial number, MAC identifier, etc. associated with system on a chip 100 and/or a device/system incorporating system on a chip 100. As such, by using UID 146 in generating the SSK, the generated SSK may also be unique to system on a chip 100 and/or a device/system incorporating system on a chip 100. Therefore, even if the SSK is discovered, the usefulness of the SSK with respect to other devices or systems is limited. Accordingly, in one embodiment, UID 146 may create a break-once-use-once situation, even where one or more other pieces of data used in the SSK calculation (e.g., SBK 143, secure device data 144, etc.) are used for more than one device. It should be appreciated that sharing of SBK 143 and/or secure device data 144 across more than one device (e.g., a class of devices, etc.) may make managing software and/or firmware updates (e.g., updating less-secure boot code 165) easier where the updates are signed or otherwise authenticated using SBK 143 and/or secure device data 144, thereby saving time and money. However, where the SSK is used to provide security for more secure data (e.g., military data stored on a personal digital assistant (PDA) or other portable electronic device), it should be appreciated that a unique SBK (e.g., 143) and/or unique secure device data (e.g., 144) may be used.

Secure device data 144 may comprise any data used to generate the SSK. It should be appreciated that secure device data 144 may be repurposed and used for other functions, and it should also be appreciated that secure device data 144 may comprise additional data. Secure device data 144 may comprise a device key in one embodiment, where the secure device data (e.g., 144) may be specified by a system manufacturer (e.g., who assembles the device incorporating system on a chip 100), as shown in FIG. 2, in one embodiment.

Figure 2:
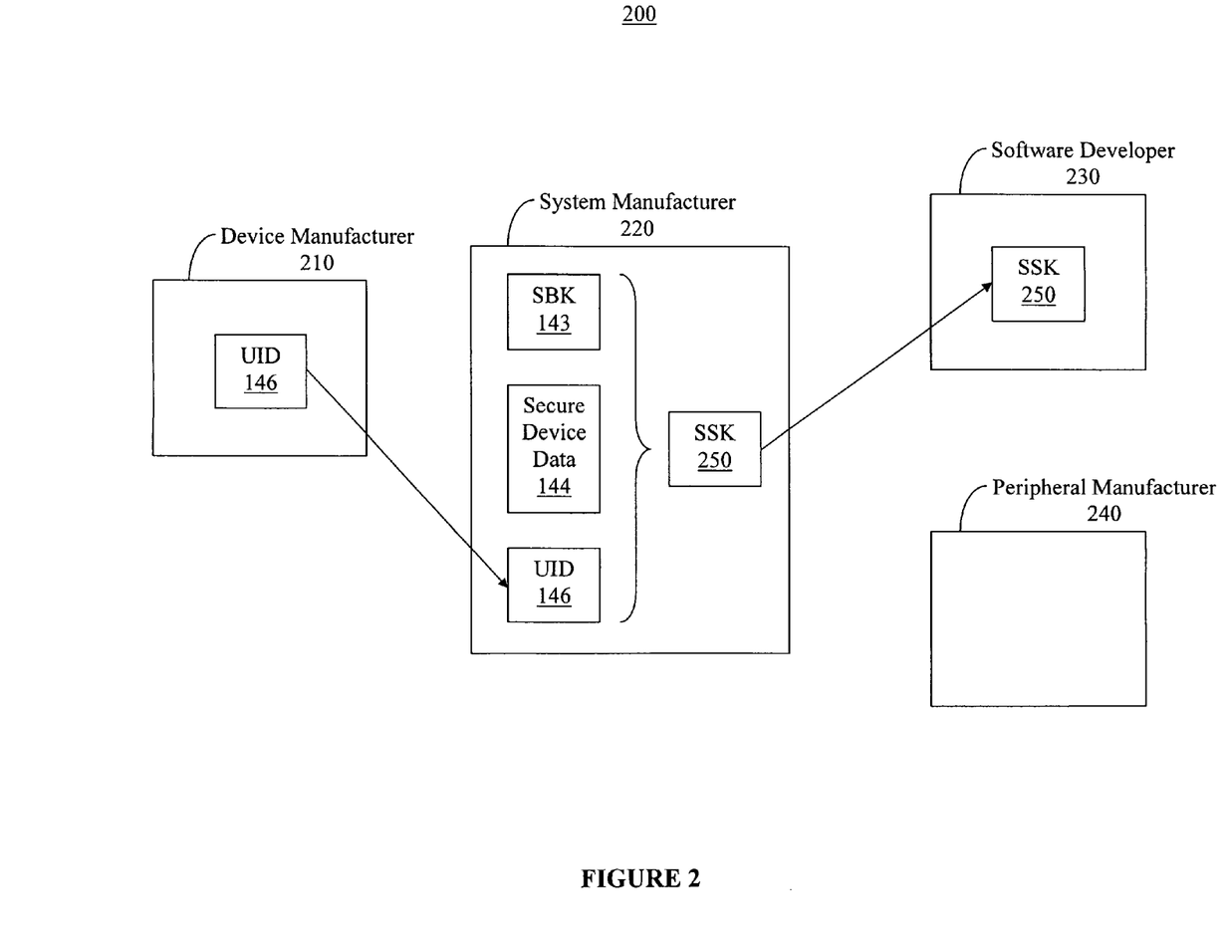
FIG. 2 shows a block diagram representing an exemplary entity relationship and a selective providing of a generated SSK to at least one other party in accordance with one embodiment of the present invention.

FIG. 2 shows a block diagram representing exemplary entity relationship 200 and a selective providing of a generated SSK to at least one other party in accordance with one embodiment of the present invention. As shown in FIG. 2, device manufacturer 210 (e.g., who manufactures system on a chip 100) may provide UID 146 to system manufacturer 220 (e.g., who assembles the device incorporating system on a chip 100). In one embodiment, the UID (e.g., 146) may be specified by device manufacturer 210, while SBK 143 may be specified by system manufacturer 220. Device manufacturer 210 and/or system manufacturer 220 may specify secure device data 144 in one embodiment. SSK 250, known to system manufacturer 220, may be generated based upon SBK 143, secure device data 144, and UID 146 as shown in FIG. 2. Thereafter, system manufacturer 220 may selectively provide SSK 250 to software developer 230 (e.g., representing a trusted party), but not provide SSK 250 to peripheral manufacturer 240 (e.g., representing a less-trusted party, an entity without a need for a secure key, etc.). In this manner, SSK 250 provides a mechanism for giving out secure keys to trusted parties without revealing secure information used to create the key (e.g., SBK 143, secure device data 144, etc.).

Turning back to FIG. 1, although system on a chip 100 is depicted in FIG. 1 with specific components, it should be appreciated that system on a chip 100 may comprise a larger or smaller number of components in other embodiments. Additionally, it should be appreciated that the functionality discussed with respect to one or more components of system on a chip 100 may be distributed across multiple components and/or combined into a smaller number of components in other embodiments. Further, although SBK 143, secure device data 144, and UID 146 may be stored in fuses 140 as discussed above, it should be appreciated that all or some of this data may be stored in other locations (e.g., within system on a chip 100, outside system on a chip 100, etc.) and/or types of storage media (e.g., ROM, RAM, flash memory, etc.) in other embodiments.

Figure 3A:
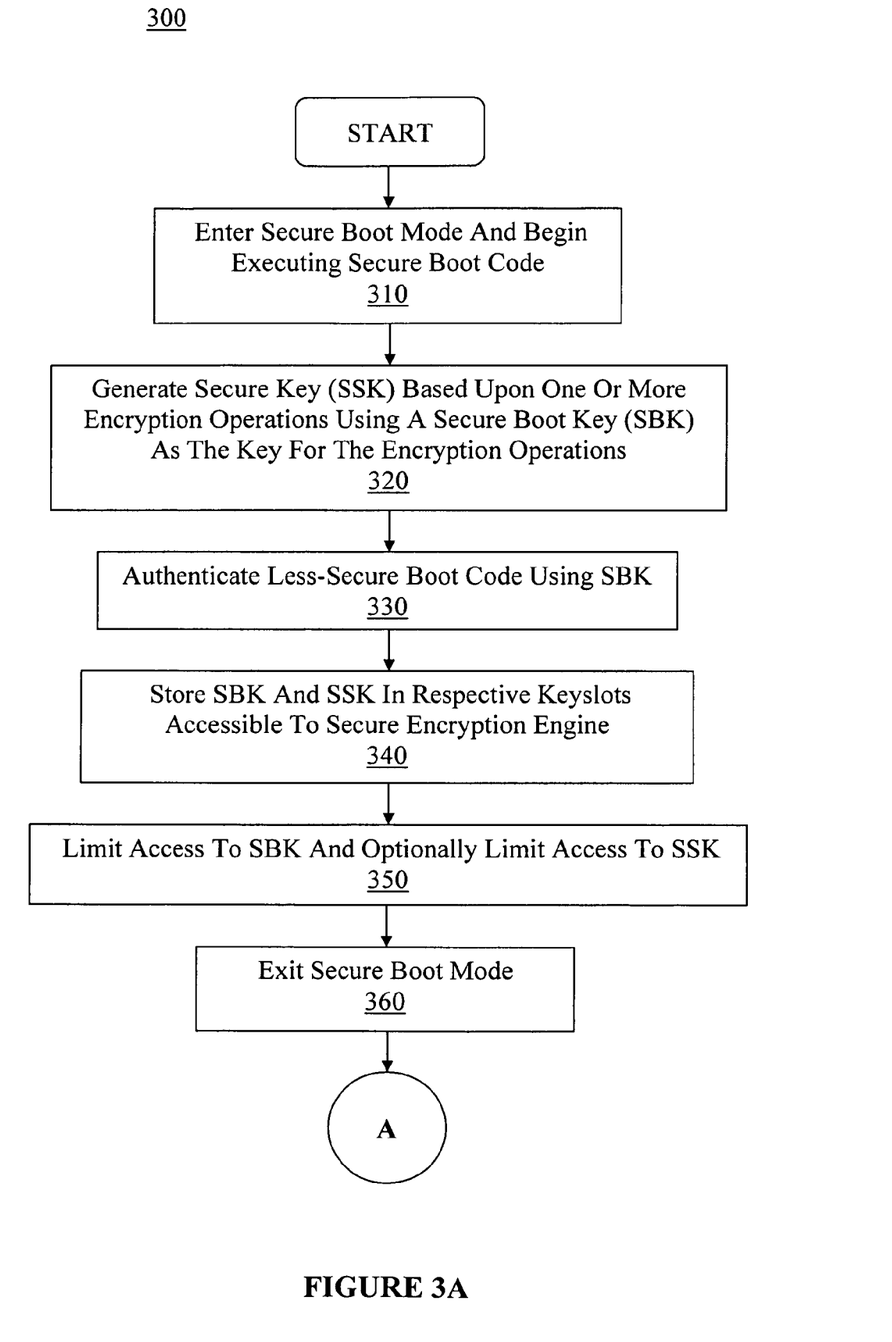
FIG. 3A shows a first flowchart of exemplary secure boot process 300 for execution by a system on a chip in accordance with one embodiment of the present invention.
Figure 3B:
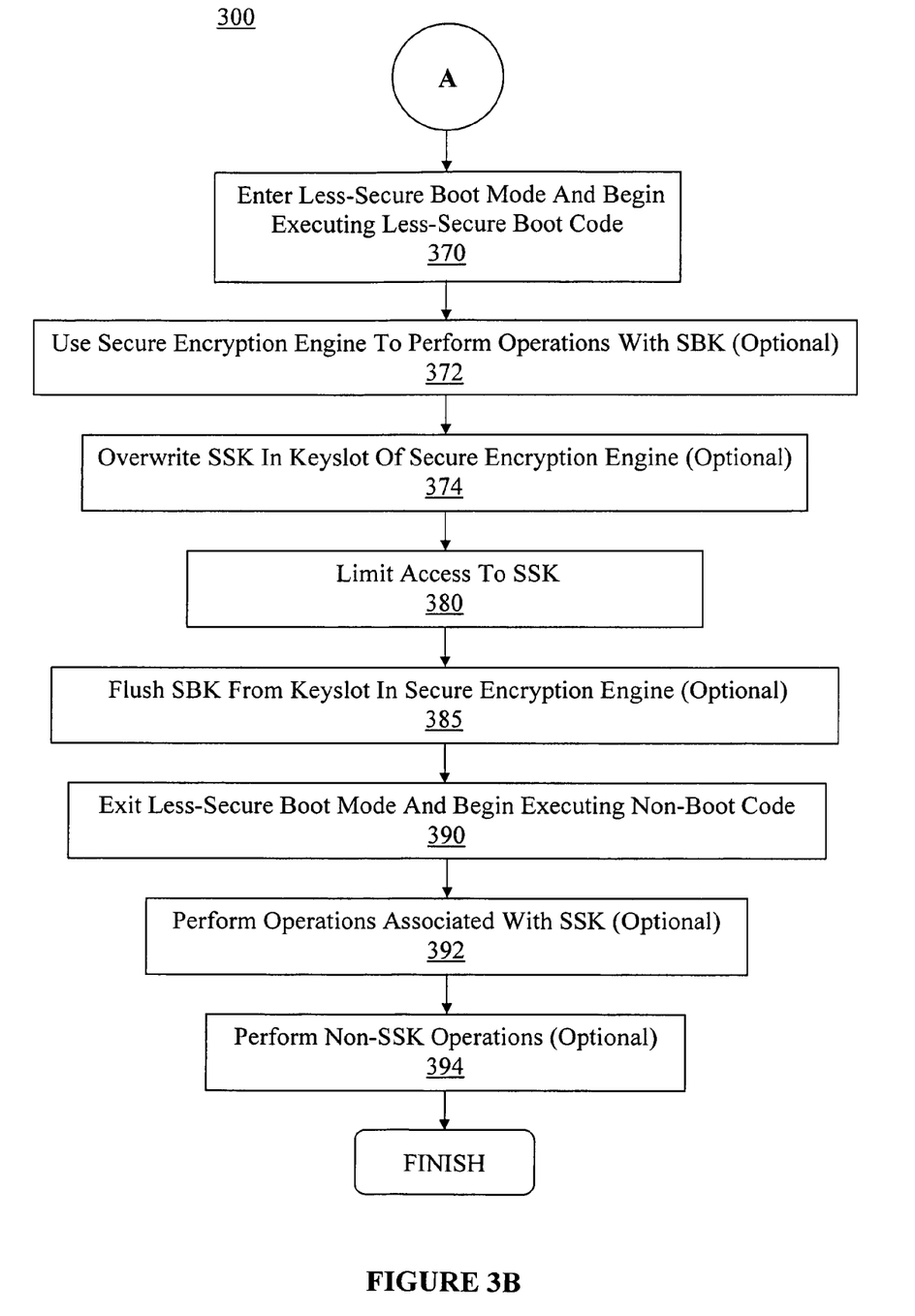
FIG. 3B shows a second flowchart of exemplary secure boot process 300 for execution by a system on a chip in accordance with one embodiment of the present invention.

FIGS. 3A and 3B show a flowchart of exemplary secure boot process 300 for execution by a system on a chip (e.g., 100) in accordance with one embodiment of the present invention. In one embodiment, one or more steps of process 300 may be performed in response to a power-on of system on a chip 100, thereby comprising an exemplary "cold boot" process. Alternatively, one or more steps of process 300 may be performed in response to a reset of system on a chip 100, thereby comprising an exemplary "warm boot" process.

As shown in FIG. 3A, step 310 involves entering a secure boot mode and beginning to execute secure boot code. The secure boot code (e.g., 155) may be executed by a CPU (e.g., 120) of the system on a chip (e.g., 100). Additionally, the secure boot code (e.g., 155) may be stored locally on a memory (e.g., 150) of the system on a chip.

Step 320 involves generating a secure key (e.g., SSK 250) based upon one or more encryption operations, or stages, using a secure boot key (e.g., SBK 143) as the key for the encryption operations. The encryption operations may be performed by a secure encryption engine of the system on a chip in one embodiment. The generated SSK (e.g., the encrypted result of the encryption operations) may be difficult to reverse engineer to discover data (e.g., SBK 143, secure device data 144, etc.) used to generate the SSK. Additionally, the encryption operations may comprise a multi-stage encryption process, such as steps 410 through 470 of process 400 of FIG. 4, in one embodiment.

As shown in FIG. 3A, step 330 involves authenticating less-secure boot code (e.g., 165) using the SBK (e.g., 143). The less-secure boot code (e.g., 165) may be accessed from a remote device or system (e.g., external to system on a chip 100) via an I/O interface (e.g., 170). The authentication may be performed by the secure encryption engine in one embodiment. The SBK (e.g., 143) may be accessed from data stored in one or more fuses (e.g., 140). Additionally, the authentication may involve encryption, decryption, comparison and/or recognition of digital signatures, some combination thereof, etc.

Step 340 involves storing the SBK (e.g., 143) and the SSK (e.g., 250) in respective keyslots accessible to the secure encryption engine (e.g., 130). For example, the SBK (e.g., 143) may be accessed from data stored in fuses (e.g., 140), and stored in a keyslot (e.g., 132) within the secure encryption engine (e.g., 130). Additionally, the SSK (e.g., 250) generated in step 320 may be stored in a keyslot (e.g., 134) within secure encryption engine (e.g., 130).

As shown in FIG. 3A, step 350 involves limiting access to SBK. For example, access to SBK 143 within fuses 140 may be limited (e.g., by secure encryption engine 130). Alternatively, access to a secure portion (e.g., 142) of the fuses (e.g., 140) may be limited (e.g., by secure encryption engine 130), thereby limiting access to the SBK (e.g., 143). As another means of limiting access to SBK, the secure encryption engine (e.g., 130) may limit access (e.g., designate as read-only, designate as write only, etc.) to a keyslot (e.g., 132) storing the SBK (e.g., 143). Alternatively, caches or other memories storing information associated with SBK (e.g., 143) may be flushed.

Additionally, access to the SSK (e.g., 250) may be optionally limited in step 350 in one embodiment. For example, the secure encryption engine (e.g., 130) may limit access (e.g., designate as read-only, designate as write only, etc.) to a keyslot (e.g., 134) storing the SSK (e.g., 250). In another embodiment, caches or other memories storing information associated with the SSK (e.g., 250) may be flushed.

Step 360 involves exiting the secure boot mode. In one embodiment, the secure boot code (e.g., 155) may finish executing and turn control over to other code (e.g., less-secure boot code 165).

As shown in FIG. 3B, step 370 involves entering the less-secure boot mode and beginning execution of less-secure boot code (e.g., 165, that authenticated in step 330, etc.). The less-secure boot code (e.g., 165) may be executed by a CPU (e.g., 120) of the system on a chip (e.g., 100). Additionally, the less-secure boot code (e.g., 165) may be stored locally on a memory (e.g., 160) of the system on a chip (e.g., 100).

Optional step 372 involves using the secure encryption engine (e.g., 130) to perform operations with the SBK. For example, the secure encryption engine may be used to perform encryption operations and/or or decryption operations (e.g., where SBK 143 is used as the encryption key), where the data to be encrypted and/or decrypted is passed to the secure encryption engine (e.g., to be encrypted and/or decrypted within secure encryption engine 130) and the secure encryption engine (e.g., 130) subsequently outputs the processed (e.g., encrypted, decrypted, etc.) data. In this manner, SBK 143 is kept secure (e.g., within secure encryption engine 130) while enabling system on a chip 100 to perform encryption and/or decryption operations while in the less-secure boot mode. Similarly, secure encryption engine 130 may be used to perform authentication operations (e.g., where the digital signature is associated with SBK 143, where authentication of the data otherwise requires knowledge of SBK 143, etc.) and/or DRM operations. Again, secure encryption engine 130 may be used to limit or otherwise control access to SBK 143 during the authentication and/or DRM operations.

As shown in FIG. 3B, optional step 374 involves overwriting the SSK in the keyslot (e.g., 134) of the secure encryption engine (e.g., 130). The new SSK used in the overwriting may be specified (e.g., by a system manufacturer who also specifies SBK 143 and/or secure device data 144, etc.) in one embodiment. Alternatively, the SSK may be regenerated. For example, new secure device data 144 may be specified (e.g., by accessing different secure device data and using the new secure device data in the calculation of the SSK, reprogramming the fuses associated with secure device data 144 to change the content of secure device data 144, etc.).

Step 380 involves limiting access to the SSK (e.g., 250). For example, the secure encryption engine (e.g., 130) may limit access (e.g., designate as read-only, designate as write only, etc.) to a keyslot (e.g., 134) storing the SSK (e.g., 250). In another embodiment, caches or other memories storing information associated with the SSK (e.g., 250) may be flushed.

Optional step 385 involves flushing the SBK (e.g., 143) from the keyslot (e.g., 132) in the secure encryption engine (e.g., 130). In one embodiment, the SBK flushing may be performed by writing all zeros into keyslot 132. Alternatively, other data may be written to keyslot 132. And in other embodiments, SBK 143 may be alternatively altered, hidden, removed, etc. Accordingly, in one embodiment, access to the SBK (e.g., 142) may be further limited (e.g., in addition to the limiting of step 350) to improve security of the SBK (e.g., 143) and/or any system (e.g., system on a chip 100) using or otherwise accessing the SBK (e.g., 143).

As shown in FIG. 3B, step 390 involves exiting the less-secure boot mode and beginning to execute non-boot code. In one embodiment, the less-secure boot code (e.g., 165) may finish executing and turn control over to other code (e.g., non-boot code). The non-boot code may reside on a memory of a device (e.g., portable electronic device, etc.) incorporating the system on a chip (e.g., 100), and may comprise an operating system or other application for execution on the device.

Optional step 392 involves performing operations associated with the SSK (e.g., 250). For example, an operating system or other application run on a device (e.g., a portable electronic device incorporating system on a chip 100) may access SSK and use SSK to encrypt, decrypt, authenticate, sign, etc. portions of data (e.g., video content, audio content, audio/video content, other data, etc.). In this manner, the SSK (e.g., 250) may be provided and used to secure data (e.g., video content, audio content, audio/video content, other data, etc.) stored on or otherwise accessed by the device while restricting access to information used to generate the SSK (e.g., SBK 143, secure device data 144, etc.). In another embodiment, data (e.g., video content, audio content, audio/video content, other data, etc.) may be passed to the secure encryption engine (e.g., 130) to perform the encrypting, decrypting, authenticating, signing, etc., thereby providing implementation flexibility and/or increased security where desired.

As shown in FIG. 3B, optional step 394 involves performing non-SSK operations. For example, tasks performed by an operating system or other application run on a device (e.g., a portable electronic device incorporating system on a chip 100) may access and/or process data without directly and/or indirectly relying upon the SSK (e.g., 250). In one embodiment, these operations may be considered normal operations of the device without use of a secure key.

Figure 4:
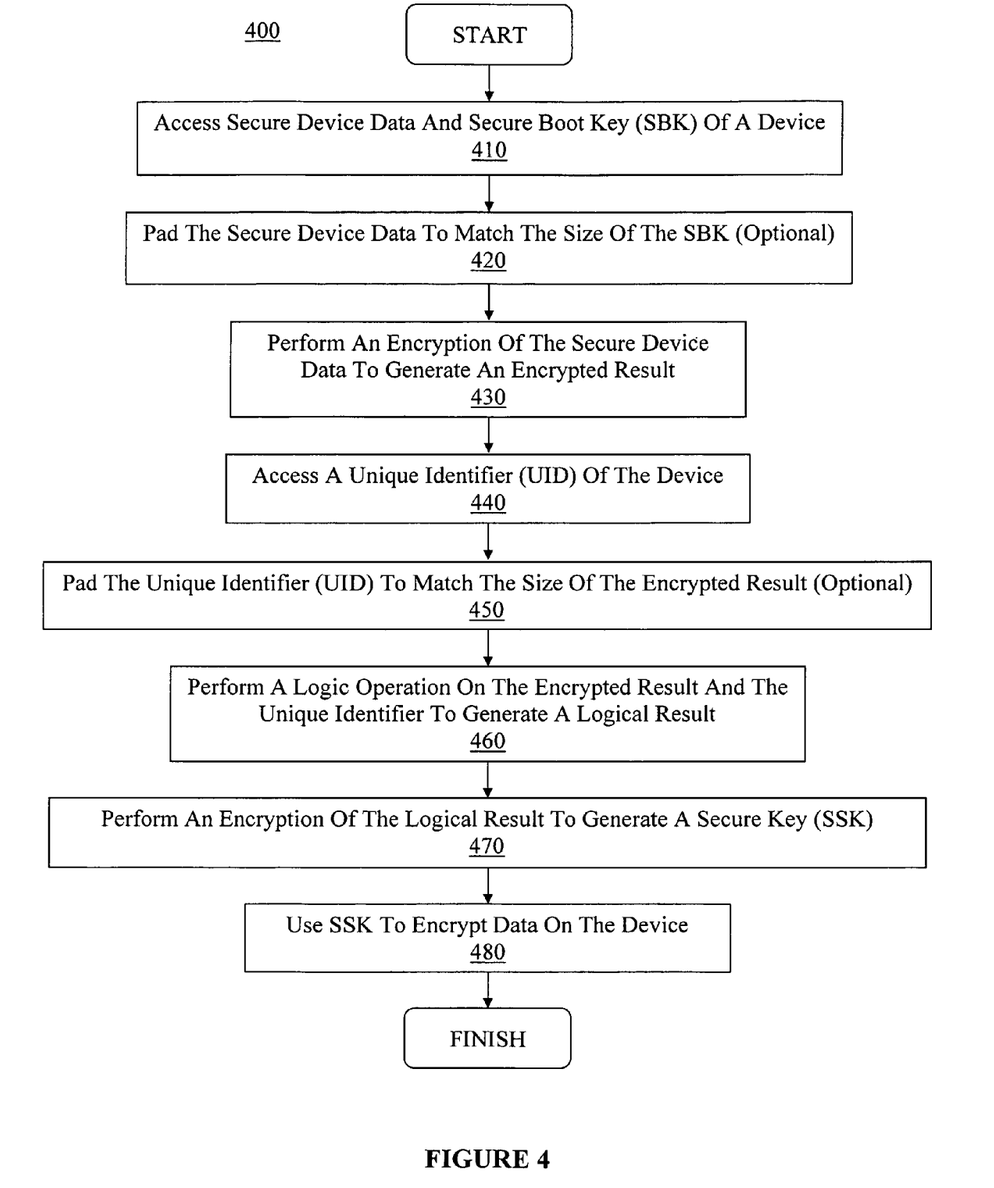
FIG. 4 shows a flowchart of an exemplary process for generating a secure key in accordance with one embodiment of the present invention.

FIG. 4 shows a flowchart of exemplary process 400 for generating a secure key in accordance with one embodiment of the present invention. As discussed above, steps 410 through 470 of process 400 may be used to implement step 320 of FIG. 3A in one embodiment. Additionally, one or more steps of process 400 may comprise a hardware-stored process (e.g., stored in firmware, etc.). Further, exemplary data flow diagram 500 of FIG. 5 will be explained in conjunction with process 400 to provide examples and help clarify the discussion.

As shown in FIG. 4, step 410 involves accessing secure device data (e.g., 144) and a secure boot key (e.g., SBK 143) of a device (e.g., a portable electronic device incorporating system on a chip 100). The secure device data (e.g., 144) and the SBK (e.g., 143) may be accessed by a secure encryption engine (e.g., 130) as depicted in FIG. 5 in one embodiment.

Optional step 420 involves padding the secure device data (e.g., 144) to match the size of the SBK (e.g., 143). For example, where the SBK is 128 bits in length and the secure device data (e.g., 144) is only 32 bits in length, then the secure device data (e.g., 144) may be padded with 96 bits of data to make the lengths of the SBK and secure device data equal. The 96 bits of padding may comprise a pattern (e.g., all zeros, all ones, alternating zeros and ones, or some other pattern) in one embodiment. Alternatively, the padding may comprise at least one copy of the secure device data (e.g., 144). For example, since the padding is 96 bits in length and the secure device data (e.g., 144) is only 32 bits in length, the 96 bits of padding may comprise 3 copies of the secure device data (e.g., 144). Additionally, the padding of step 420 may be performed by the secure encryption engine (e.g., 130) in one embodiment.

Figure 5:
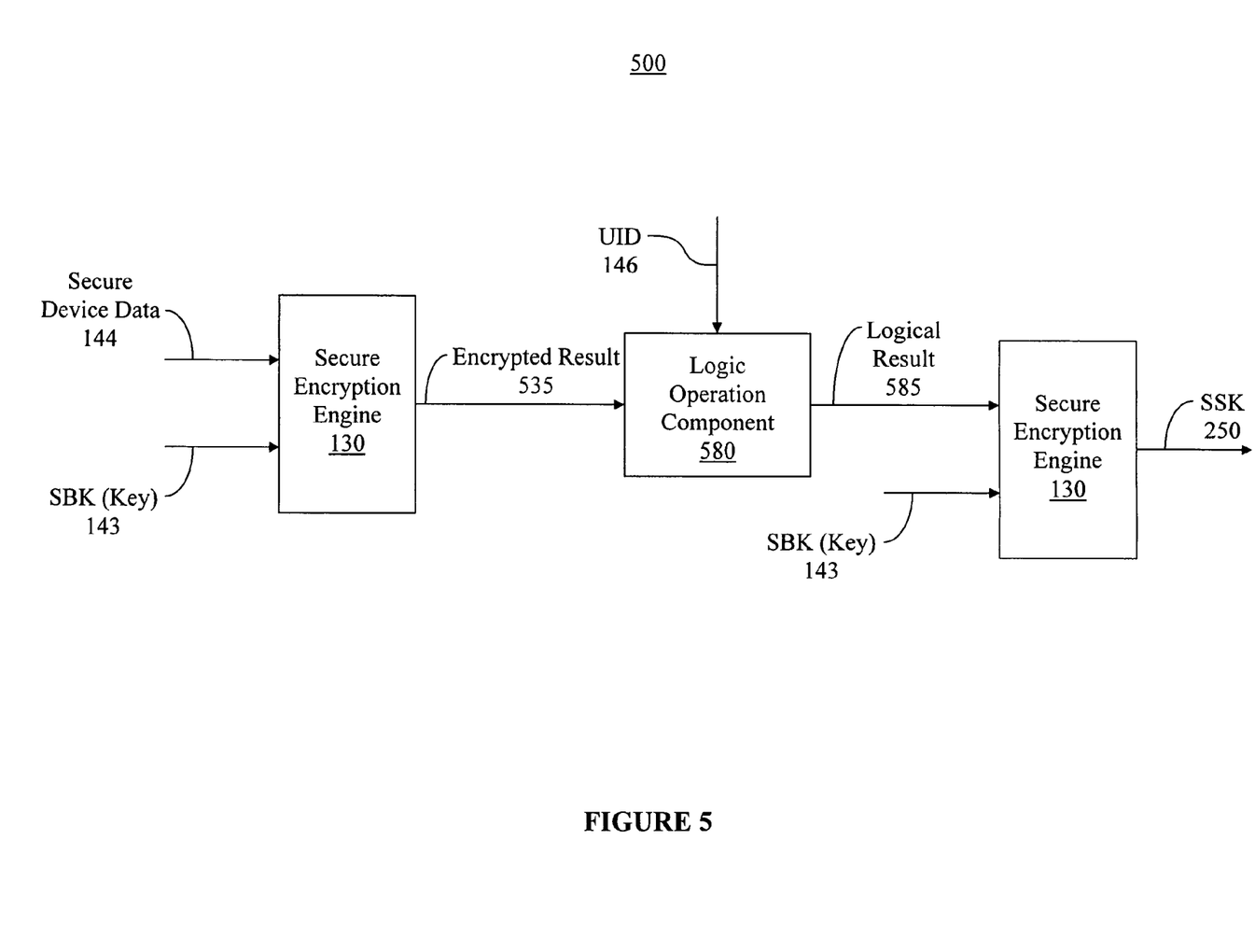
FIG. 5 shows an exemplary data flow diagram depicting the generation of a secure key in accordance with one embodiment of the present invention.

As shown in FIG. 4, step 430 involves performing an encryption of the secure device data (e.g., 144, padded secure device data 144 generated in step 420, etc.) to generate an encrypted result (e.g., 535 as shown in FIG. 5). For example, as shown in FIG. 5, secure encryption engine 130 may encrypt secure device data 144 (or the padded secure device data 144 generated in step 420) using SBK 143 as the encryption key. Encryption result 535 may be generated by secure encryption engine 130 based upon the encryption of the secure device data (e.g., 144). Additionally, the encryption performed in step 430 may comprise symmetric key cryptography in accordance with the advanced encryption standard (AES) in one embodiment. Accordingly, step 430 may implement the following function in one embodiment:

encrypted result=AES(SBK; DK);

where "encrypted result" may comprise encrypted result 535, "SBK" may comprise SBK 143, and "DK" may comprise secure device data 144.

Step 440 involves accessing a unique identifier (e.g., UID 146) of the device. The unique identifier (e.g., 146) may be accessed by a logical operation component (e.g., 580 as depicted in FIG. 5) in one embodiment.

As shown in FIG. 4, optional step 450 involves padding the unique identifier (e.g., accessed in step 440) to match the size of the encrypted result (e.g., generated in step 430). For example, where the encrypted result is 128 bits in length and the unique identifier (e.g., UID 146) is only 64 bits in length, then the unique identifier (e.g., UID 146) may be padded with 64 bits of data to make the lengths of the encryption result and unique identifier equal. The 64 bits of padding may comprise a pattern (e.g., all zeros, all ones, alternating zeros and ones, or some other pattern) in one embodiment. Alternatively, the padding may comprise at least one copy of the unique identifier (e.g., UID 146). For example, since the padding is 64 bits in length and the unique identifier (e.g., UID 146) is 64 bits in length, the 64 bits of padding may comprise one copy of the unique identifier (e.g., UID 146). Additionally, the padding of step 450 may be performed by the secure encryption engine (e.g., 130) and/or a logical operation component (e.g., 580) in one embodiment.

Step 460 involves performing a logical operation on the encrypted result and the unique identifier to generate a logical result (e.g., 585 as depicted in FIG. 5). The logical operation may be performed by logical operation component 580 as shown in FIG. 5 in one embodiment. Additionally, the logical operation may comprise an XOR operation (e.g., bit-by-bit comparison and XOR) of the encrypted result (e.g., 535) and the unique identifier (e.g., UID 146, padded UID 146 generated in step 450, etc.). In other embodiments, the logical operation may comprise another logical operation (e.g., a bit-by-bit XNOR operation, a bit-by-bit OR operation, a bit-by-bit AND operation, etc.) of the encrypted result (e.g., 535) and the unique identifier (e.g., UID 146, padded UID 146 generated in step 450, etc.). Accordingly, step 460 may implement the following function in one embodiment:

logical result=UID XOR(encrypted result)

where "logical result" may comprise logical result 585, "UID" may comprise UID 146, and "encrypted result" may comprise encrypted result 535.

As shown in FIG. 4, step 470 involves performing an encryption of the logical result (e.g., 585) to generate a secure key (e.g., SSK 250). For example, as shown in FIG. 5, secure encryption engine 130 may encrypt logical result 585 using SBK 143 as the encryption key. The SSK (e.g., 250) may be generated by secure encryption engine 130 based upon the encryption of the logical result (e.g., 585). Additionally, the encryption performed in step 470 may comprise symmetric key cryptography in accordance with the advanced encryption standard (AES) in one embodiment. Accordingly, step 470 may implement the following function in one embodiment:

SSK=AES[SBK; (logical result)];

where "SSK" may comprise SSK 250, "SBK" may comprise SBK 143, and "logical result" may comprise logical result 585.

Step 480 involves using the SSK (e.g., 250) to perform encryption operations on the device. For example, data stored on a portable electronic device (e.g., incorporating system on a chip 100) may be secured (e.g., by a user, by an application running on the portable electronic device, etc.) using the SSK. Consequently, the data may be decrypted using the SSK. Additionally, the SSK may be used to perform other operations on the device (e.g., as discussed with respect to step 392 of FIG. 3) in one embodiment.

Although only one logical operation step (e.g., step 460) is discussed above with respect to FIGS. 4 and 5, it should be appreciated that more than one logical operation on the data may be performed when generating a secure key (e.g., SSK 250) in other embodiments. Where more than one logical operations are performed, it should be appreciated that each logical operation may comprise the same logical operations or different logical operations. Additionally, only two encryption stages have been discussed with respect to FIGS. 4 and 5, it should be appreciated that a larger or smaller number of encryption stages may be used to generate a secure key (e.g., 250) in other embodiments. Further, it should be appreciated that different data is encrypted in one or more of the encryption stages in other embodiments.

Figure 6:
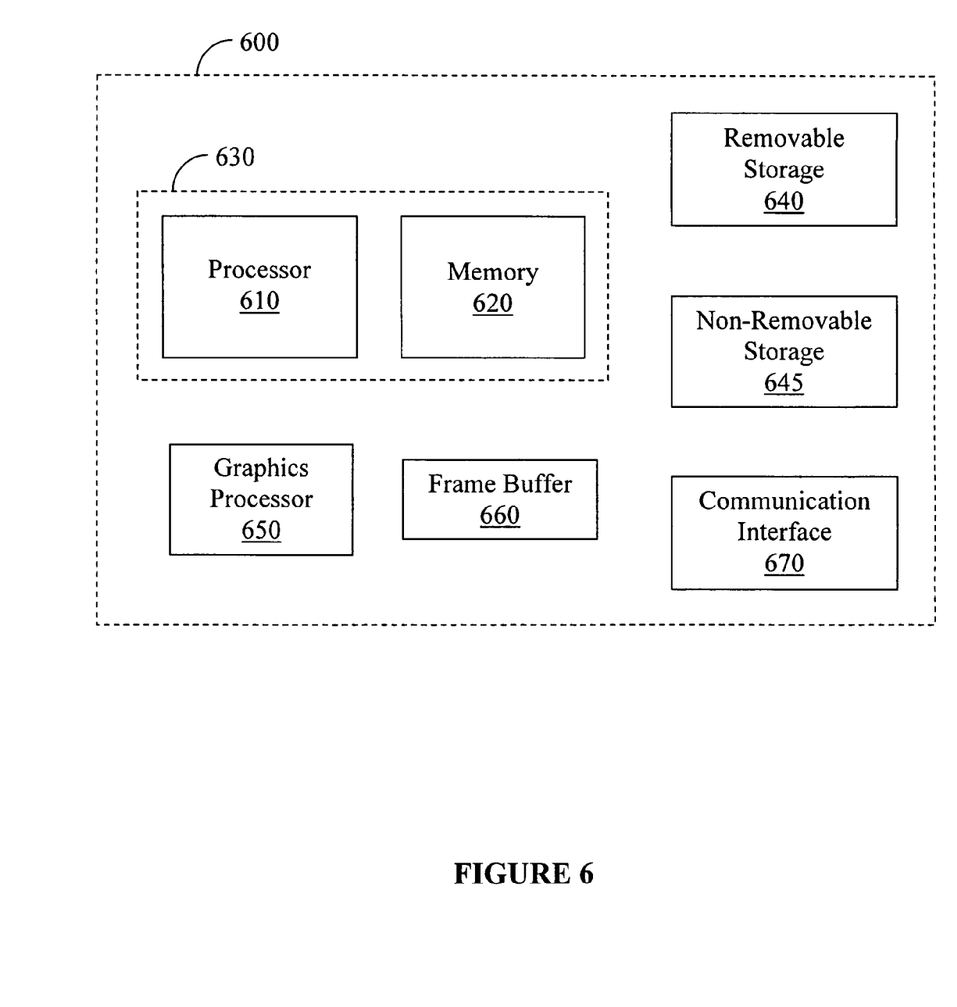
FIG. 6 shows an exemplary computer system platform upon which embodiments of the present invention may be implemented.

FIG. 6 shows exemplary computer system platform 600 upon which embodiments of the present invention may be implemented. As shown in FIG. 6, portions of the present invention are comprised of computer-readable and computer-executable instructions that reside, for example, in computer system platform 600 and which may be used as a part of a general purpose computer network (not shown). It is appreciated that computer system platform 600 of FIG. 6 is merely exemplary. As such, the present invention can operate within a number of different systems including, but not limited to, general-purpose computer systems, embedded computer systems, laptop computer systems, hand-held computer systems, portable computer systems, portable electronic devices, stand-alone computer systems, game consoles, some combination thereof, etc.

In one embodiment, depicted by dashed lines 630, computer system platform 600 may comprise at least one processor 610 and at least one memory 620. Processor 610 may comprise a central processing unit (CPU) or other type of processor. Depending on the configuration and/or type of computer system environment, memory 620 may comprise volatile memory (e.g., RAM), non-volatile memory (e.g., ROM, flash memory, etc.), or some combination of the two. Additionally, memory 620 may be removable, non-removable, etc.

In other embodiments, computer system platform 600 may comprise additional storage (e.g., removable storage 640, non-removable storage 645, etc.). Removable storage 640 and/or non-removable storage 645 may comprise volatile memory, non-volatile memory, or any combination thereof. Additionally, removable storage 640 and/or non-removable storage 645 may comprise CD-ROM, digital versatile disks (DVD) or other optical storage, magnetic cassettes, magnetic tape, magnetic disk storage or other magnetic storage devices, or any other medium which can be used to store information for access by computer system platform 600.

As shown in FIG. 6, computer system platform 600 may communicate with other systems, components, or devices via communication interface 670. Communication interface 670 may embody computer readable instructions, data structures, program modules or other data in a modulated data signal (e.g., a carrier wave) or other transport mechanism. By way of example, and not limitation, communication interface 670 may couple to wired media (e.g., a wired network, direct-wired connection, etc.) and/or wireless media (e.g., a wireless network, a wireless connection utilizing acoustic, RF, infrared, or other wireless signaling, etc.).

Communication interface 670 may also couple computer system platform 600 to one or more input devices (e.g., a keyboard, mouse, pen, voice input device, touch input device, etc.) and/or output devices (e.g., a display, speaker, printer, etc.).

As shown in FIG. 6, graphics processor 650 may perform graphics processing operations on graphical data stored in frame buffer 660 or another memory (e.g., 620, 640, 645, etc.) of computer system platform 600. In one embodiment, graphics processor 650 and processor 610 may be combined into a single unit, thereby forming a general purpose processor (e.g., system on a chip 100). Graphical data stored in frame buffer 660 may be accessed, processed, and/or modified by components (e.g., graphics processor 650, processor 610, etc.) of computer system platform 600 and/or components of other systems/devices. Additionally, the graphical data may be accessed (e.g., by graphics processor 650) and displayed on an output device coupled to computer system platform 600. Accordingly, memory 620, removable storage 640, non-removable storage 645, frame buffer 660, or a combination thereof, may comprise instructions that when executed on a processor (e.g., 610, 100, etc.) implement a method of generating a secure key (e.g., SSK 250).

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of generating a secure key for use on a device, said method comprising:
   accessing secure device data and a secret key from said device, wherein said secure device data and said secret key are stored in fuses accessible to said device;
   authenticating a first boot code for execution by said device using said secret key;
   performing a first encryption of said secure device data to generate an encrypted result, wherein said first encryption comprises encrypting said secure device data using said secret key as an encryption key;
   accessing a unique identifier of said device;
   performing a logical operation on said encrypted result and said unique identifier to generate a logical result;
   performing a second encryption of said logical result to generate said secure key, wherein said second encryption comprises encrypting said logical result using said secret key as an encryption key, wherein said secure key is unique to said device, and wherein said secure key is larger than said secure device data; and
   storing said secure key in a first memory of said device, wherein said first encryption and said second encryption are performed following execution of a second boot code;
   storing keying data associated with one or more of said secure key and said secret key in a second memory of said device;
   limiting access to the first memory; and
   purging keying data associated with one or more of said secure key and said secret key from the second memory of said device.

2. The method of claim 1 further comprising:
   providing access to said secure key while restricting access to said secret key; and
   using said secure key to encrypt information on said device.

3. The method of claim 1, wherein said unique identifier is provided by a first party, and wherein said secure device data and said secret key are provided by a second party.

4. The method of claim 1, wherein said secure device data is selected from a group consisting of data unique to said device and data unique to a class of devices, wherein said class of devices comprises said device.

5. The method of claim 1, wherein said secret key is selected from a group consisting of data unique to said device and data unique to a class of devices, wherein said class of devices comprises said device.

6. The method of claim 1, wherein said secure device data is smaller than said secret key, and wherein said method further comprises:
   padding said secure device data to increase the size of said secure device data prior to said first encryption, wherein said padding is selected from a group consisting of padding said secure device data with a plurality of zeros.

7. The method of claim 1, wherein said first encryption and said second encryption comprises symmetric key cryptography in accordance with the advanced encryption standard (AES), and wherein said logical operation comprises an XOR operation.

8. An integrated circuit for use in a portable electronic device, said integrated circuit comprising:
   a microprocessor;
   a plurality of fuses storing a secret key, secure device data, and a unique identifier of said portable electronic device, wherein said secret key authenticates a first boot code for execution by said integrated circuit;
   a secure encryption engine coupled to said plurality of fuses and for performing a first encryption of said secure device data to generate an encrypted result, wherein said first encryption uses said secret key as an encryption key, wherein said secure encryption engine further performs a logical operation on said encrypted result and said unique identifier to generate a logical result, wherein said secure encryption engine further performs a second encryption of said logical result to generate a secure key, wherein said second encryption uses said secret key as an encryption key, wherein said secure key is unique to said portable electronic device, wherein said first and second encryption enable access to said secure key without revealing said secret key, and wherein said secure key is larger than said secure device data and wherein said secure encryption engine further performs said first encryption and said second encryption responsive to an execution of a second boot code;
   a first memory couple to said microprocessor to store said secure key, wherein access to the first memory is limited;
   a second memory to store keying data associated with one or more of said secure key and said secret key, wherein said keying data associated with one or more of said secure key and said secret key is subsequently purged from said second memory of said integrated circuit.

9. The integrated circuit of claim 8 further comprising:
said second memory storing said first boot code; and
said microprocessor coupled to said second memory and executing said first boot code and authenticating a second boot code using said secret key, said second boot code executes after said first boot code, and wherein said central processing unit further initiates said first and second encryption by said secure encryption engine during execution of said first boot code.

10. The integrated circuit of claim 8, wherein said secure encryption engine further provides access to said secure key while restricting access to said secret key, wherein said secure key is for encrypting information on said portable electronic device, wherein said first memory comprises a keyslot of said secure encryption engine, and wherein said secure key is stored within said keyslot.

11. The integrated circuit of claim 8, wherein said unique identifier is provided by a first party, and wherein said secure device data and said secret key are provided by a second party.

12. The integrated circuit of claim 8, wherein said secure device data is selected from a group consisting of data unique to said portable electronic device and data unique to a class of portable electronic devices, wherein said class of portable electronic devices comprises said portable electronic device.

13. The integrated circuit of claim 8, wherein said secure encryption engine further pads said secure device data to increase the size of said secure device data prior to said first encryption, wherein said padding performed by said secure encryption engine is selected from a group consisting of padding said secure device data with a plurality of zeros and padding said secure device data with at least one copy of said secure device data.

14. The integrated circuit of claim 8, wherein said secure encryption engine further performs symmetric key cryptography in accordance with the advanced encryption standard (AES), and wherein said logical operation comprises an XOR operation.

15. A computer system comprising:
a microprocessor;
a first memory coupled to said microprocessor; and
an integrated circuit coupled to said microprocessor, said integrated circuit comprising:
a plurality of fuses storing a secret key, secure device data, and a unique identifier of said computer system, wherein said secret key is for authenticating a first boot code for execution by said integrated circuit; and
a secure encryption engine coupled to said plurality of fuses and for performing a first encryption of said secure device data to generate an encrypted result, wherein said first encryption uses said secret key as an encryption key, wherein said secure encryption engine further performs a logical operation on said encrypted result and said unique identifier to generate a logical result, wherein said secure encryption engine further performs a second encryption of said logical result to generate a secure key, wherein said second encryption uses said secret key as an encryption key, wherein said secure key is unique to said portable electronic device, and wherein said first and second encryption enable access to said secure key without revealing said secret key, and wherein said secure key is larger than said secure device data, and wherein said secure encryption engine further performs said first encryption and said second encryption responsive to an execution of a second boot code; and
a second memory stores said secure key with limited access thereto wherein keying data associated with one or more of said secure key and said secret key is subsequently purged from the first memory.

16. The computer system of claim 15, wherein said integrated circuit further comprises:
a third memory storing said first boot code; and
said microprocessor coupled to said third memory and executing said boot code and authenticating additional boot code using said secret key, said second boot code for execution after said first boot code, and wherein said central processing unit further initiates said first and second encryption by said secure encryption engine during execution of said first boot code.

17. The computer system of claim 15, wherein said secure encryption engine further provides access to said secure key while restricting access to said secret key, wherein said secure key is for encrypting information on said computer system, wherein said second memory comprises a keyslot of said secure encryption engine, and wherein said secure key is stored within said keyslot.

18. The computer system of claim 15, wherein said unique identifier is provided by a first party, and wherein said secure device data and said secret key are provided by a second party.

19. The computer system of claim 15, wherein said secret key is selected from a group consisting of data unique to said computer system and data unique to a class of computer systems, wherein said class of computer systems comprises said computer system.

20. The computer system of claim 15, wherein said secure encryption engine further performs symmetric key cryptography in accordance with the advanced encryption standard (AES), and wherein said logical operation comprises an XOR operation.

* * * * *